US012644167B2

(12) United States Patent
Reid et al.

(10) Patent No.: US 12,644,167 B2
(45) Date of Patent: Jun. 2, 2026

(54) MATERIAL AND USES THEREOF

(71) Applicant: TENMAT LIMITED, Manchester (GB)

(72) Inventors: Daniel Philip Reid, Manchester (GB); Kapil Chopra, Manchester (GB); Andrew Gareth Williams, Manchester (GB)

(73) Assignee: TENMAT LIMITED, Manchester (GB)

( * ) Notice: Subject to any disclaimer, the term of this patent is extended or adjusted under 35 U.S.C. 154(b) by 245 days.

(21) Appl. No.: 18/198,260

(22) Filed: May 16, 2023

(65) Prior Publication Data

US 2023/0374633 A1     Nov. 23, 2023

(30) Foreign Application Priority Data

May 17, 2022    (GB) ..................................... 2207205

(51) Int. Cl.
| | |
|---|---|
| *C22C 26/00* | (2006.01) |
| *B32B 5/16* | (2006.01) |
| *B32B 18/00* | (2006.01) |

(52) U.S. Cl.
CPC ................ *C22C 26/00* (2013.01); *B32B 5/16* (2013.01); *B32B 18/00* (2013.01);
(Continued)

(58) Field of Classification Search
CPC .............. C22C 26/00; C22C 2026/003; C22C 2026/006; C22C 2026/008; C22C 1/1036; C22C 1/051; B32B 5/16; B32B 18/00;

B32B 2264/108; B32B 2307/7376; B32B 2264/1023; B32B 5/22; B32B 7/12; E05B 15/1614; B22D 19/02; B22F 3/10
See application file for complete search history.

(56) References Cited

U.S. PATENT DOCUMENTS

| | | | | |
|---|---|---|---|---|
| 5,755,299 A | * | 5/1998 | Langford, Jr. ..... | B23K 35/0266 |
| | | | | 175/375 |
| 2012/0102843 A1 | * | 5/2012 | Chakraborty ........... | C04B 35/00 |
| | | | | 51/307 |

(Continued)

FOREIGN PATENT DOCUMENTS

| | | |
|---|---|---|
| CN | 109930022 B | 12/2020 |
| WO | 2018138743 A1 | 8/2018 |

*Primary Examiner* — Michael Zhang
(74) *Attorney, Agent, or Firm* — Andrew D. Bochner; Bochner PLLC

(57) ABSTRACT

A material 100 for an anti-theft device is described. The material 100 comprises a binder 102, a first type of particles 104, a second type of particles 106, and graphene layer 114 between the binder and each of the first type of particles 104 and second type of particles 106. The first type of particles 104 are selected from at least one of diamond and cubic boron nitride 'CBN', and the second type of hard particles are selected from at least one of a metallic carbide and a ceramic material. The first particles resist a cutting action of a cutting tool and the second particles degrade the cutting tool during the cutting action. The graphene bonds the particles to the binder to prevent the particles being dislodged by a cutting action. The result of the combination of these actions is to delay the time for an operator of a cutting tool to cut through the material 100.

20 Claims, 8 Drawing Sheets

(52) U.S. Cl.
    CPC . *B32B 2264/108* (2013.01); *B32B 2307/7376*
        (2023.05); *C22C 2026/003* (2013.01); *C22C*
        *2026/006* (2013.01); *C22C 2026/008* (2013.01)

(56)                     References Cited

U.S. PATENT DOCUMENTS

2013/0139446  A1*   6/2013  Malik  ................. C04B 35/6303
                                                               51/307
2018/0265415  A1*   9/2018  Hosty  ................. C04B 41/5001

* cited by examiner

MATERIAL AND USES THEREOF

FIELD OF THE INVENTION

The present disclosure relates in general to a material and particularly to a material for use in combatting a cutting action of a cutting tool. More specifically, the present disclosure concerns a material which may resist a rotational cutting tool such as angle grinders, drills, and the like. The material of the present disclosure is particularly envisaged for use in anti-theft devices such as bicycle locks, shackles, safes, security doors and the like.

BACKGROUND

Battery powered (hand held) angle grinders have become a weapon of choice for thieves looking to cut through most types of current heavy duty anti-theft devices, such as cycle/motorcycle locks and shackles.

FIG. 1 shows an example of such a battery powered angle grinder 10—or more generally a rotational cutting tool—being used to cut through an object 20; for example a typical anti-theft device such as a locking bar.

A typical angle grinder 10 comprises a cutting disc 12 (typically 0.8 mm-2.5 min thick, 100-1.50 mm diameter) made from silicon carbide particles—or similar—bonded by resin to a woven cloth carrier. The silicon carbide provides the disc 12 with an abrasive surface for grinding away at an object.

The cutting disc 12 rotates at very high speeds, typically around 25,000 revolutions per minute (RPM) for a battery powered angle grinder 10. When an edge 14 of the cutting disc 12 is brought into contact with the object 20, the disc cuts into the object through a combination of extreme temperature and abrasion.

The extreme temperature is a result of very high friction between the disc 12 and the object 20; this causes surface material of the object 20 to soften (and potentially melt) in the region where the disc 12 is applied. The abrasive nature of the silicon carbide removes the softened material such that a cut is made into the solid material. The high RPM means this process is continually repeated and, in combination with constant pressure applied by an operator 1 of the angle grinder 10 (i.e. a thief), will eventually result in the angle grinder 10 cutting all the way through the anti-theft device 20.

A modern angle grinder 10 with appropriate cutting disc 12 can cut through most current day locks, etc, within seconds. Accordingly, many solutions have been developed over the years to resist the speed at which an angle grinder 10 may cut through a lock (or other anti-theft device), and thus deter a thief armed with an angle grinder 10.

One known solution is to use a hard metal in the anti-theft device—e.g. on a surface of the device which is likely to be cut. A hard metal will have a greater resistance to the abrasion effects of the disc 12, and therefore can somewhat slow the cutting rate of the cutting disc.

Another known solution is to use very soft metals or materials in the anti-theft device which blind the cutting tool; soft material clogs gaps in-between the hard particles on the surface of the cutting disc 12 (or e.g. the teeth in a classic circular saw), thus reducing the effective abrasiveness of the cutting disc 12 to slow the cutting process.

Another known solution is to use a combination of both a hard material, such as ceramic, and a soft material, thereby attempting to gain both direct cutting resistance and clogging of the disc 12.

A further known solution is to use materials in the anti-theft device which produce noxious fumes when the material is heated, thus deterring the thief and preventing a successful cut. At least in theory. Once this material is known to a thief it is not much additional effort for them to come prepared with an appropriate face mask with air filter.

A more recent approach to anti-theft devices utilises a material in which diamond is provided within a binder comprising metallic powders, such as in WO2018/138743.

Broadly, however, the above materials can be summarised generally as making a very fast cutting operation marginally slower. Therefore, while these materials offer some benefit, they do not generally deter a determined thief from cutting through the anti-theft device to free a secured item.

It is therefore highly desirable to provide a material for use with anti-theft devices which further deters a thief from cutting through an anti-theft device.

The example embodiments have been provided with a view to addressing at least some of the difficulties that are encountered with current anti-theft devices and materials, whether those difficulties have been specifically mentioned above or will otherwise be appreciated from the discussion herein.

SUMMARY

The present invention is defined according to the independent claims. Additional features will be appreciated from the dependent claims and the description herein. Any embodiments which are described but which do not fall within the scope of the claims are to be interpreted merely as examples useful for a better understanding of the invention.

It is an aim of the present invention to overcome at least one of the above or other disadvantages. In particular, it is an aim of the present invention to provide a material which not only better resists a rotary cutting tool, thereby increasing the cutting time, but also actively attacks the cutting tool to reduce said tools effectiveness and, ultimately, to cause the tool to require replacement.

Accordingly, in one aspect of the invention there is described a material which combats a rotary cutting tool and is suitable for incorporation into an anti-theft device. The material comprises a binder (such as a mild steel matrix), a first type of particles and a second type of particles, and graphene. The first type of particles are selected from at least one of diamond and cubic boron nitride 'CBN'. The second type of hard particles are selected from at least one of a metallic carbide and a ceramic material. The graphene forms an interface (or bonding) layer between each of the particles and the binder. In some examples, some graphene dissolves into the binder, forming a carbon laced zone around the particles.

The first type of hard particles resist the cutting action of the tool, primarily by limiting the temperature the tool can generate. The second type of hard particles degrades the tool during the cutting action, ideally to wear the cutting tool to a point where the tool can no longer function effectively. Thus the two types of particles act in combination to deter a would-be thief by increasing a time taken to cut through the material. The graphene significantly improves the bond strength between the particles and the binder, making it far more difficult to dislodge the particles from the binder. Thus the graphene allows the first and second particles to remain embedded in the binder, thereby indirectly improving the effectiveness of the first and second particles at attacking a cutting tool.

It is noted that graphene is critical to the enhanced anti-theft performance of the material due to its ability to more effectively disperse throughout the binder and bond to the particles. Other forms of carbon added to the material, for example graphite, do not provide the same benefit.

In one aspect of the invention there is described a method of manufacture of the aforementioned material by hot sintering, whereby the first and second particles and graphene are sintered together with the binder.

In one aspect of the invention there is described a method of applying the aforementioned material to an object. Example techniques include welding, casting into a metal matrix, and bonding by a strong polymer.

In one aspect of the invention there is described a product incorporating the aforementioned material. Example products include locks, including bicycle locks, shackles and safes, and more generally any security/anti-theft device.

BRIEF DESCRIPTION OF THE DRAWINGS

The present disclosure will now be discussed by way of example only with reference to the accompanying drawings, in which.

DETAILED DESCRIPTION

Figure 1:
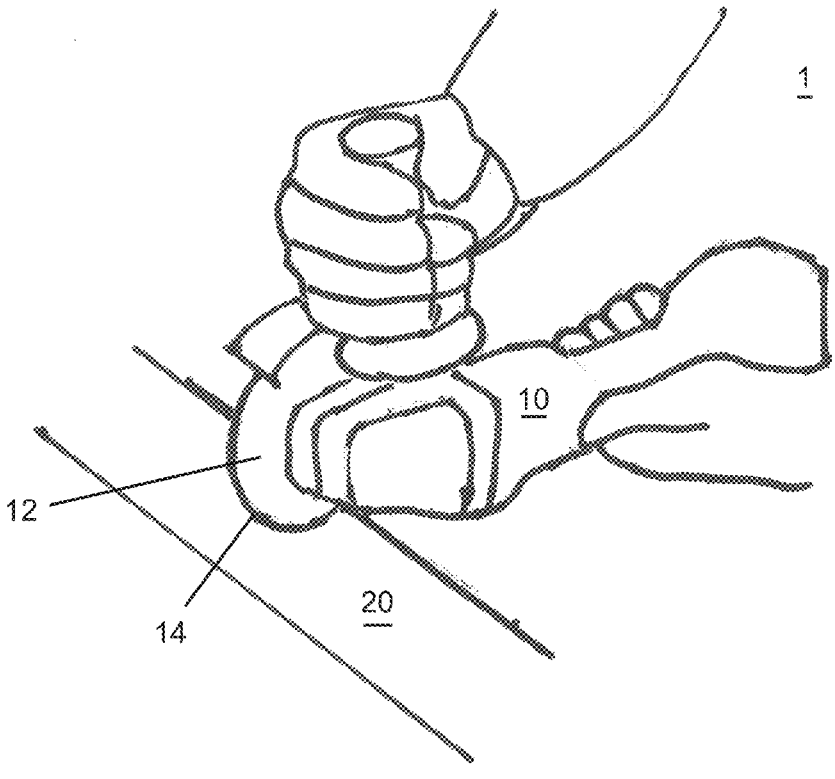
FIG. 1 shows an angle grinder attacking a prior art anti-theft device.

Throughout the following continued reference will be made to the cutting process of FIG. 1. That is, the present disclosure is suitably framed within the context of improving the ability of an object 20, in particular an anti-theft device, to withstand a cutting component 12 of a cutting tool 10. The cutting component is envisaged as any rotating cutting implement such as a disc of an angle grinder or a head of a drill bit, and the cutting tool 10 envisaged as any powered cutting tool, in particular a hand-held battery powered tool.

Accordingly, at least some of the following example embodiments provide an improved material for withstanding a cutting tool 10. More specifically the improved material is provided for combatting the cutting component 12 of the cutting tool 10.

As a cutting component 12 rotates it is abraded. This abrasion can result in a size of the cutting component 12 being reduced to a point where it is no longer viable for cutting through an object. This is particularly true for disc type cutting components due to their thin thickness. When this occurs the cutting component 12 needs to be replaced before cutting can continue. Replacing the cutting component (e.g. disc) involves the use of specialist tools as well as requiring a potentially significant time investment. This is time in which an operator 1 (i.e. thief) is at their most vulnerable. The more time the operator 1 is exposed attempting to cut through an anti-theft device 20, then greater the likelihood of discovery and capture.

Thus, the more changes of a cutting component 12 that are required to cut through a material, the greater the deterrent to the thief 1, as the advantage of speed normally provided by their powered tool 10 is diminished.

Therefore, in contrast to prior art materials, the example material which is the subject of the present disclosure is designed at least partly to wear down the cutting component 12 so as to, if possible, force a change of the cutting component 12. Many other advantages and improvements will be appreciated from the discussion herein.

An Improved Cutting Resistant Material

Figure 2A:
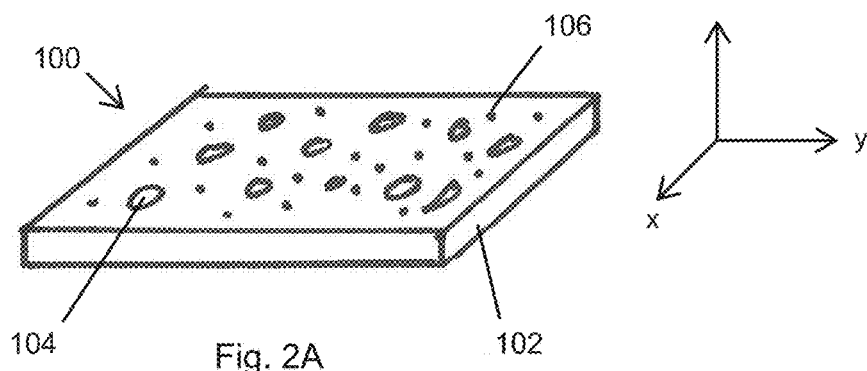
FIG. 2A shows a schematic of an example improved material in perspective view.
Figure 2B:
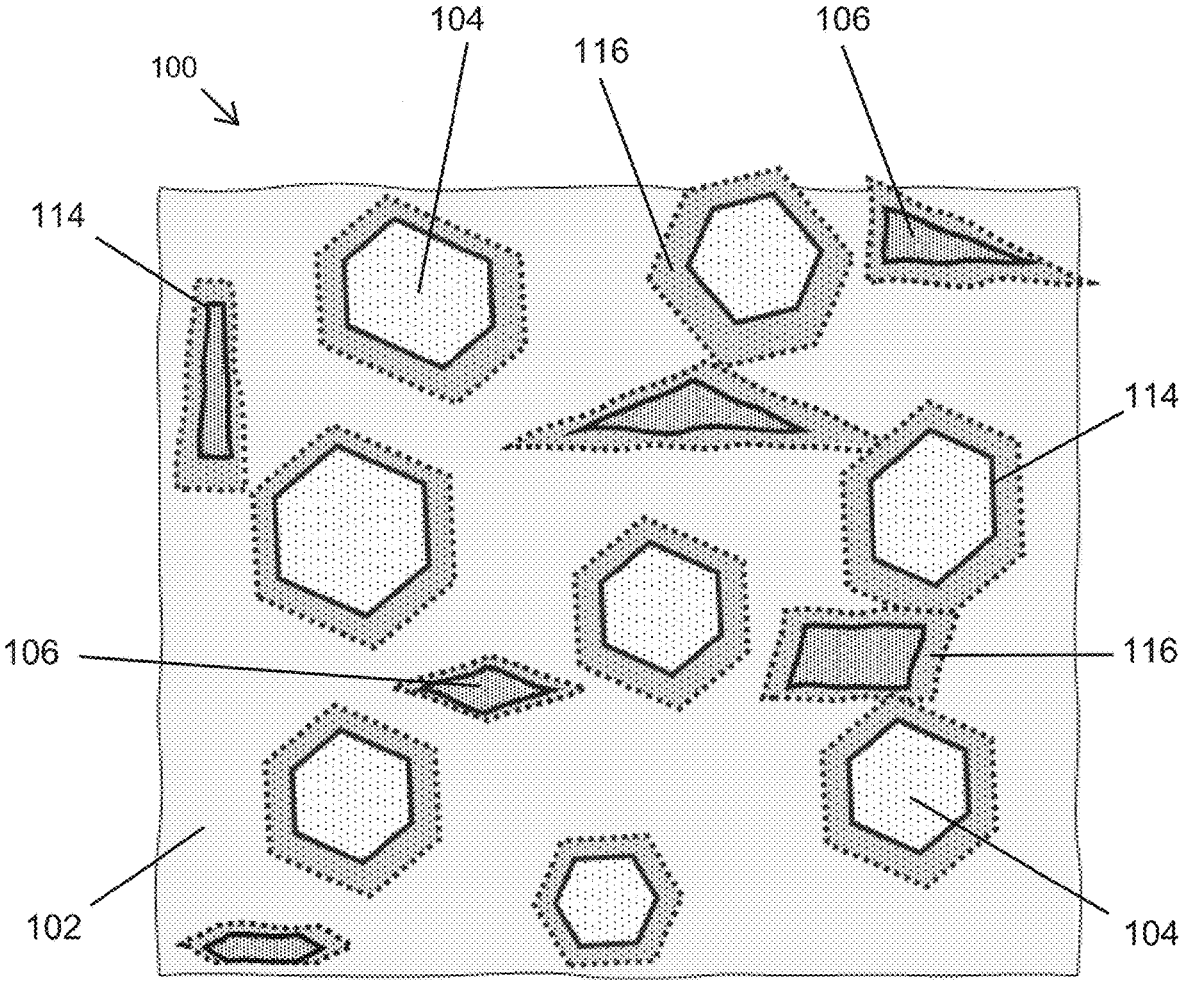
FIG. 2B shows a top down (z axis) view of the example improved material.

FIG. 2 shows an improved material 100 for resisting a cutting tool 10. FIG. 2A shows a schematic of the material 100 in perspective view. While FIG. 2B shows a top down (i.e. along the z axis) view of the material 100. The material 100 comprises a substrate 102 within which is interspersed a first type of hard particles 104 and a second type of hard particles 106. Herein the term substrate is used to mean a binder, or matrix, material in which other constituent parts are held, and accordingly the terms substrate, binder, and (metal) matrix are used synonymously in the following. Hard in this context generally means returning a high value from a Rockwell or Vickers test; for example, a 'high hardness' would be indicated by a hardness greater than approximately 1500 kg/mm$^2$ using a Vickers indenter. The first type of hard particles 104 are schematically shown generally hexagonal in shape, while the second type of hard particles 106 are schematically shown as irregular oblongs; it will be appreciated that these shapes are chosen only for demonstrative purposes and may not reflect the shapes of the actual particles in the final product.

Each of the hard particles 104, 106 is surrounded by a layer of graphene 114 which separates the hard particles from the binder 102 (demonstrated by the thick black borders to the hexagons and oblongs shown in FIG. 2B). That is, the graphene forms an interface layer 114 between the binder 102 and particles 104, 106. Put another way, it can be considered that each of the hard particles 104, 106 comprise a layer of graphene at the interface—i.e., boundary—between a respective particle and the binder 102.

In the present examples, the graphene forms a layer up to 0.345 nm (nanometres) thick, thereby providing a complete (100%) layer of carbon (graphene of course being a particular carbon structure) around each of the hard particles in the material. Such a thickness may arise from incorporating graphene into the material in a range of 0.00001 to 20 percent by weight, or by volume, of the material.

It should however be appreciated that other thicknesses of graphene, including graphene interfaces between the binder 102 and hard particles 104, 106 which are only partially comprised of graphene—e.g., 25% graphene, 50% graphene, 75% graphene, the remainder being binder material—are also within the scope of the present disclosure. Also, not all particles will necessarily have the same thickness of graphene or indeed the same amount of graphene at the interface; e.g., some hard particles 104, 106 may comprise a 100% graphene interface 114, while some hard particles 104, 106 may comprise a lower percentage graphene interface 114.

The graphene interface (or layer) 114 beneficially improves the bond strength between the binder 102 and hard particles 104, 106 making it harder for a cutting tool 10 to dislodge the hard particles 104, 106 from the material 100 during a cutting action.

In addition, each of the first hard particles 104 and second hard particles 106 will usually be surrounded by a reaction zone 116; the reaction zone extends (or penetrates) into the binder starting from the graphene layer 114. The reaction zone 116 is formed as a result of graphene dissolving into the binder 102 during formation of the material 100. Thus the reaction zone comprises a concentration gradient of carbon (which may be dissociated carbon atoms, or small strands of graphene) ranging from 0% carbon at a zone boundary within the binder 102 (away from the particles 104, 106) to 100% carbon at the graphene layer 114 (or whatever percentage of graphene forms the graphene layer 114). The reaction zone 116 is many orders of magnitude larger than the graphene layer 114. In the present example, whereby the graphene layer 114 is substantially 0.345 nm thick, the reaction zone 116 is 20 microns thick.

As with the graphene layer 114, the reaction zone 116 significantly aids bonding of the hard particles 104, 106 to the binder 102, thereby enhancing cutting resistance of the material 100.

It will of course be appreciated that whether a reaction zone 116 of any measurable size forms will depend on the amount of graphene used in construction of the material 100.

The first hard particles 104 and second hard particles 106 advantageously act in combination to resist cutting of the material 100 by the culling component 12 of the cutting tool 10. In particular, the combination of hard particles 104, 106 reduce both a temperature produced by, and an abrasion caused by, the cutting component 12 on a surface of an object 20. Hence why it is highly desirable that the particles 104, 106 cannot simply be dislodged.

The first hard particles 104 may be provided to reduce the amount of heat that can be generated by the cutting tool. Suitably the first particles 104 may be a low friction material.

As the primary mechanism by which a rotating cutting tool generates heat is by friction, reducing the amount of friction reduces the amount of heat produced. Without sufficient heat the cutting tool cannot soften a surface 108 of the material 100 being cut. Without a softened surface 108 the abrasive part(s) of the cutting tool cannot as easily remove—i.e. cut into—the surface 108 of the material 100. In this way the time to cut through the material 100 may be significantly increased. Suitable materials for use as the first hard particles include diamond and cubic boron nitride 'CBN'. Preferably the first hard particles 104 are diamond, which is a known low friction element.

Investigations performed by the applicant have found that the particle size of the first particles 104 can have an effect on the efficiency of heat reduction. Particles 104 which are too large are likely to become too separated from one another, which reduces the likelihood of there being an adjacent diamond particle to conduct heat to. Particles 104 which are too small are unable to store a sufficient amount of heat or conduct that heat away to nearby particles efficiently. It has been found that first particle sizes in the range of 50 to 350 microns provide measurable benefits to the functioning of the material 100; e.g., such sized particles yield suitable heat conduction. It has further been determined that first particle sizes in the range of 75 to 300 microns yields further improvements to the functioning of the material 100. Preferably the material 100 is manufactured such that the first particle sizes are in the range of 100 to 250 microns, as this provides good tolerance for achieving the ranges above. In order to achieve optimum heat reduction, an average size of the first particles 104 are preferably in the range of 150 to 180 microns. These size ranges are applicable for both diamond and CBN.

The second type of hard particles 106 may be provided to give the material 100 an abrasive component. Abrasive second particles 106 serve two purposes. Firstly, being a hard particle means that the second particles 106 resist abrasion by the cutting tool. Secondly, being abrasive causes wear on the cutting disc.

Suitable materials for use as the second particle species 106 include metallic carbides such as tungsten, titanium, chromium and ceramic materials such as silicon carbide and alumina. Preferably the second particle species is tungsten carbide.

Similar to before, the particle size of the second particles 106 can have varying effects on the optimisation of the material 100. If the second particles 106 are too small, then they will be insufficient to bite into—i.e. abrade—the cutting component 12. If the second particles 106 are too large then the cutting component 12 is liable to slide over a surface of the particles rather than be abraded by them.

To achieve an optimum amount of wear on the cutting component 12, the second particles 106 are typically provided in the range of 100 to 250 microns. Preferably an average size of the second particle species is approximately 170 microns. Thus in a preferred embodiment of the invention the particle size of the first particles 104 and second particles 106 are substantially similar.

In addition to particle sizing, it has also been determined that particle spacing has an effect on the efficiency of cutting resistance by the material 100. The particle sizes 104, 106 are directly correlated to the average particle separation by the relation:

$$S = d\left(\frac{1}{V} - 1\right), \tag{1}$$

where d is the particle size, V is volume fraction, and S is the spacing between particles in an isotropic matrix (solid). Thus, in general, the larger a particle size is the greater its average separation to like particles—i.e., first species to first species—and conversely smaller particles at the same volume fraction will have a smaller spacing. By way of example, 100 micron particles at 0.1 volume fraction have an average spacing of 900 microns, while 50 micron particles at 0.1 volume fraction have an average spacing of 450 microns.

The average particle separation determines whether the cutting component 12 is able to slip between gaps in the particles 104, 106 to thereby cut into the material 100. Thus the average particle separation may suitably be an input parameter which is varied depending on the intended usage of the material. For example, the average particle separation may be relatively larger if the intended usage of the material 100 is to combat a cutting disc (which may be 0.8 mm to 2.5 mm thick), and relatively smaller if the intended usage is to prevent a small drill bit (which may only 0.05 mm thick). It is generally cheaper to provide finer particles at lower volume fractions, and therefore it is preferable to use smaller particles, however there is a limit to going too small as too small a particle size will not provide the benefits to temperature reduction and abrasion discussed above, even though the particle separation is small enough to catch the cutting component 12.

In optimal arrangements the particle separation is such that the cutting component 12 is not able to penetrate into the surface of the material 100, and instead merely slides along the surface—at least initially; as time progresses wear of the first and second particle species will probably allow the cutting component 12 to gain a purchase on the surface of the material 100. Preferably the nominally average spacing of the first particles 104 is substantially 2 mm while the nominally average spacing of the second particles 106 is substantially 0.5 mm.

As mentioned above, the binder 102 serves as a bulk body, or matrix, for holding the hard particles 104, 106 as well as to provide the material 100 with ductility. That is, the binder 102 allows the material 100 to be pliable and deformable. As such the matrix body 102 may be suitably formed from a soft material. Suitably soft materials may have a typical Vickers hardness of less than 800 HV. Soft materials have the further advantage that, as in known anti-theft materials, the soft matrix body may blind the cutting component 12. Example soft materials include metals and resin.

Preferably the matrix body 102 is formed from a soft metal such as mild steel, although notably other steel substrates (e.g. hardened steel) are also suitable. Care should be taken with resin however as it will not be suitable for all applications. Resin does not provide rigid support for the hard particles 104, 106 and so may be liable to chiseling; thus resin is generally only preferable when the material 100 is not directly accessible—i.e. it is encapsulated in some way such that it is not directly accessible by a cutting tool.

Furthermore, the choice of soft material is linked to the choice of second particles 106. If the binder 102 is metallic then metallic carbides are appropriate. In a resin binder 102 ceramic materials are generally more appropriate.

Suitably the binder 102 may also be provided to aid with dissipating heat generated by the cutting component 12. That is, the binder 102 may aid conducting heat away from particles of the first particle species 104 which are in contact with the cutting component 12. In this way the binder 102 further reduces the potential for the cutting tool to generate enough heat to soften the material 100 in the area where the cutting component 12 is applied.

Figure 3:
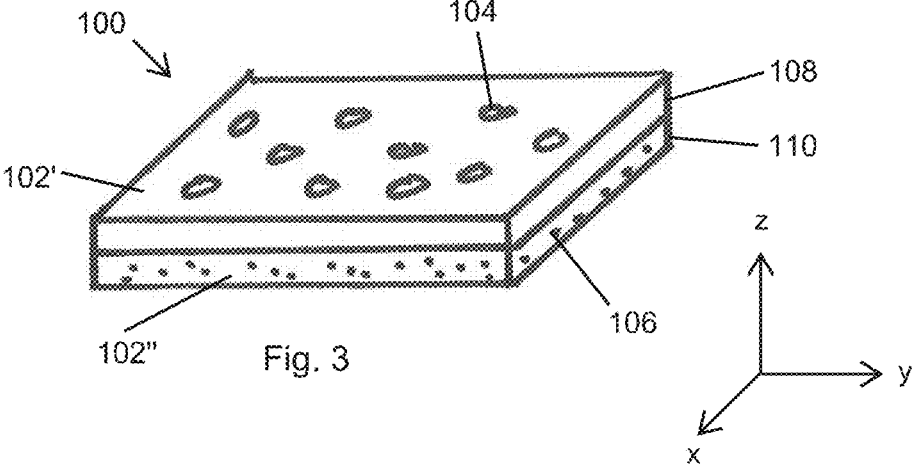
FIG. 3 shows another example improved material.

FIG. 3 shows another example material 100 which builds on the above principles. In this example the first hard particles 104 and second hard particles 106 may be segregated into distinct layers 108 & 110 (graphene of course being provided around particles in both layers 108, 110). In this way the material 100 may be provided with a laminate structure. That is, the first layer 108 may comprise the first type of hard particles 104 held within a binder 102', and the second layer 110 may comprise the second type of hard particles 106 held within a binder 102". The binders 102' and 102" may be either the same material, analogous to as described above, or different materials.

Suitably the layers 108, 110 are each provided to be thin such that a cutting component 12 interacts with both layers substantially simultaneously. In this way a laminate structure provides similar cutting resistance to a material 100 in which the particle species are mixed together in a single layer (optionally termed a 'cake mix' structure). Preferably each of the layers 108, 110 is no more than 2 mm thick. Advantageously a laminate structure provides greater impact resistance over a single layer mixed structure.

Figure 4:
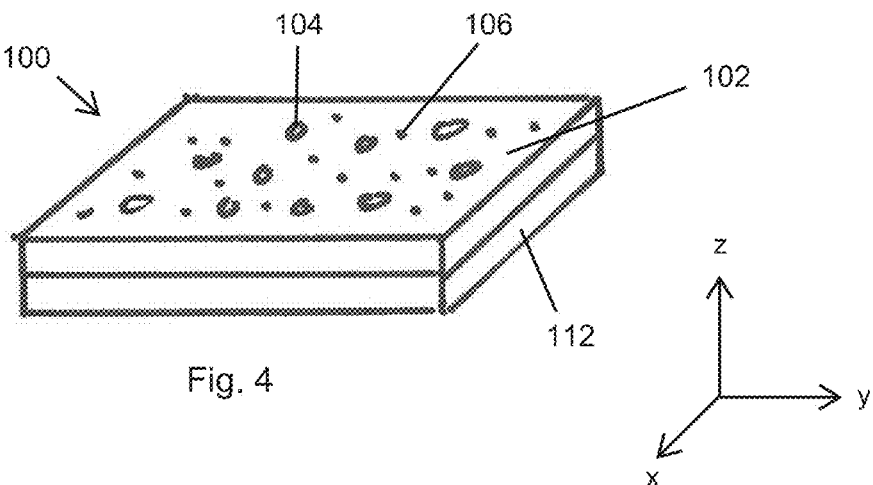
FIG. 4 shows another example improved material.

FIG. 4 shows another example material 100 building on the principles just discussed. In this example the material 100 further comprises a base plate 112 on which the binder/ matrix body 102 is located. The base plate 112 may be formed as part of the material 100 during manufacture, or may be bonded to the binder 102 (which comprises the particles 104, 106) after manufacture of the base plate 112.

Suitably the base plate 112 may provide the material with toughness such that it has improved impact resistance—e.g. to attacks from hammer blows—compared to a material 100 without the base plate 112. Preferably the base plate 112 is formed from steel, although it will be appreciated that other suitably impact resistant materials could be used instead. Further advantageously the base plate 112 is more readily bonded (e.g. welded) to other component parts of an anti-theft device compared to the material 100 in isolation.

FIG. 5 shows example methods of manufacture of the material 100. Here the example material 100 is manufactured by a hot sintering technique.

Figure 5A:
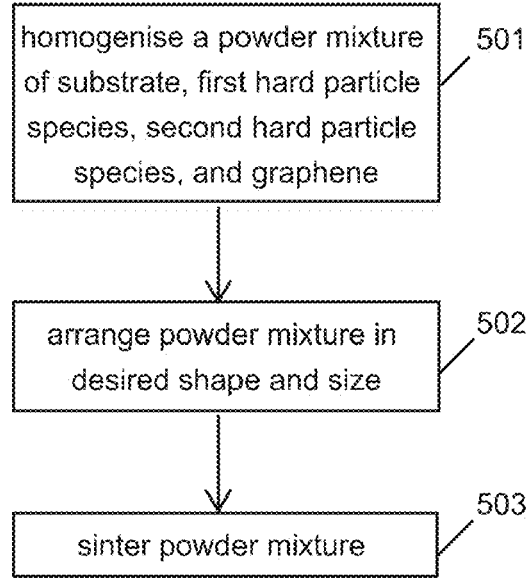
FIG. 5A shows an example method of manufacture of the example improved material according to FIGS. 2A & 2B.

FIG. 5A shows a method of manufacture of a 'cake mix' material 100 as demonstrated by FIG. 2. At step 501 a powder mixture of the material components—namely the binder 102, first type of hard particles 104, second type of hard particles 106, and graphene—is mixed until it is homogenised. Suitably, in a preferred embodiment the powder mixture is a mixture of mild steel, diamond, tungsten carbide, and graphene. At step 502 the homogenised powder mixture is formed into a biscuit (or wafer) of the desired shape and size for the intended usage of the material 100. For example, the powder mixture may be provided in the shape of a rectangle, as indicated by FIGS. 2, 3 & 4. At this stage the powder mixture may be optionally provided on the backing plate 112. At step 503 the powder mixture is sintered together to form the finished material product 100 (with or without the backing plate 112, depending on step 502). It is during the sintering process that the graphene bonds to the hard particles 104, 106 to form the graphene layer 114 and partly dissolves to form the reaction zone 116.

Figure 5B:
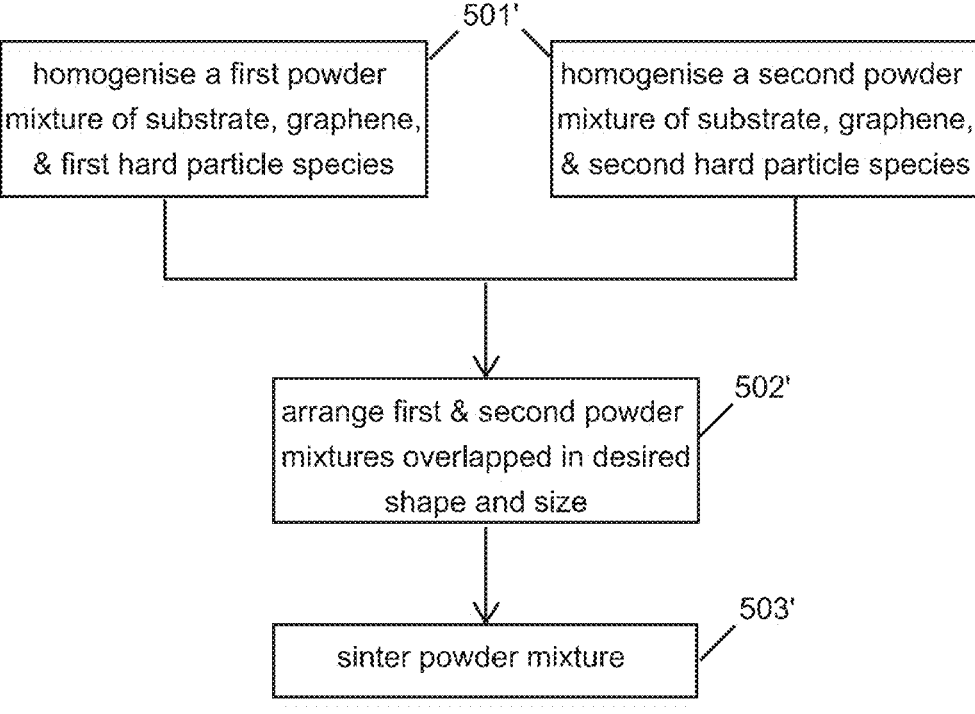
FIG. 5B shows an example method of manufacture of the example improved material according to FIG. 3.

FIG. 5B shows a modified method of manufacture whereby the material 100 has a layered structure demonstrated by FIG. 3. Here a first step 501' comprises separately homogenising a first powder mixture comprising the binder 102 and first type of hard particles 104, and a second powder mixture comprising the binder 102 and second type of hard particles. Thus, in a preferred embodiment, the first powder mixture may comprise a homogenised mixture of mild steel, diamond, and graphene, while the second powder mixture may comprise a homogenised mixture of mild steel, tungsten carbide and graphene. Step 502' is similar to step 502; here the first layer is formed into a biscuit (or wafer) and then the second layer is formed on top of the first layer (or the second layer is formed first and first layer formed on top); that is the biscuit is initially formed of a layered powder structure. Again, at this stage the powder mixtures may be optionally provided on the backing plate 112. Step 503' comprises sintering the layered powder mixture to form the finished material product 100.

It has been determined that forming the material by a process of hot sintering has particular advantages for the microstructure of the material and, accordingly, its performance.

Figure 10A:
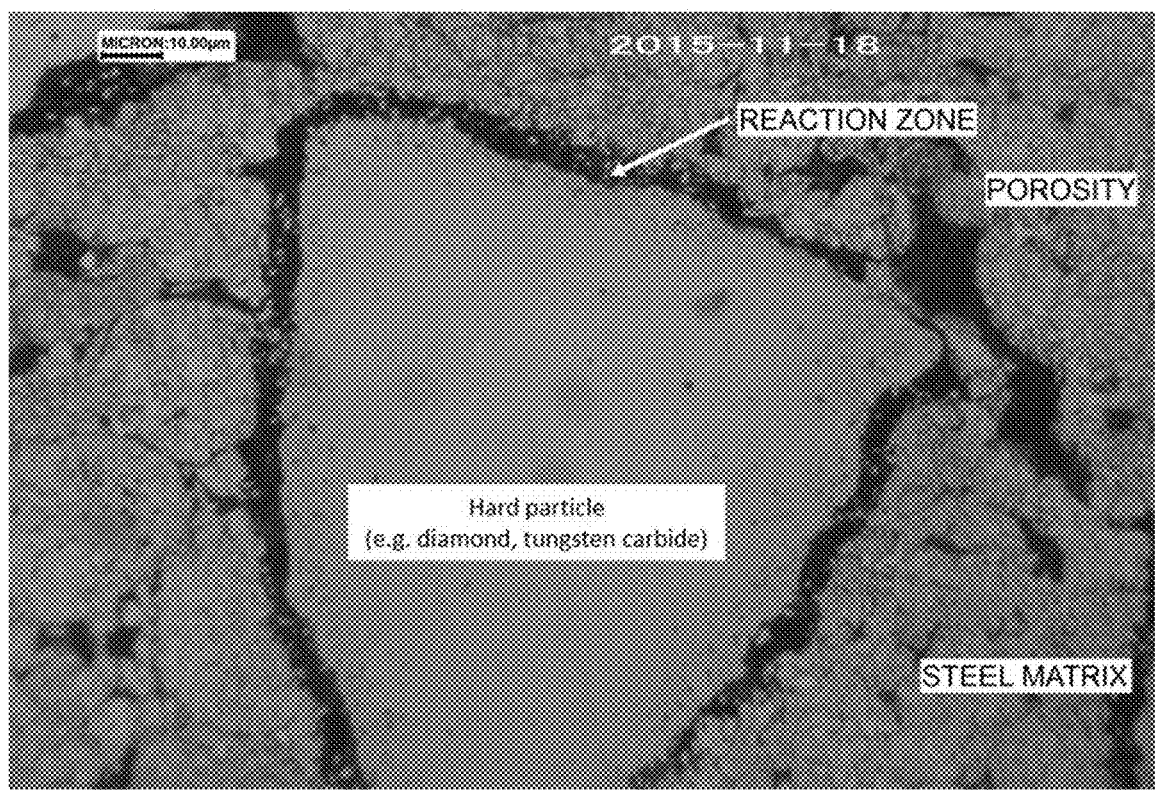
FIG. 10A shows the microstructure of an example material manufactured using a hot sintering approach.
Figure 10B:
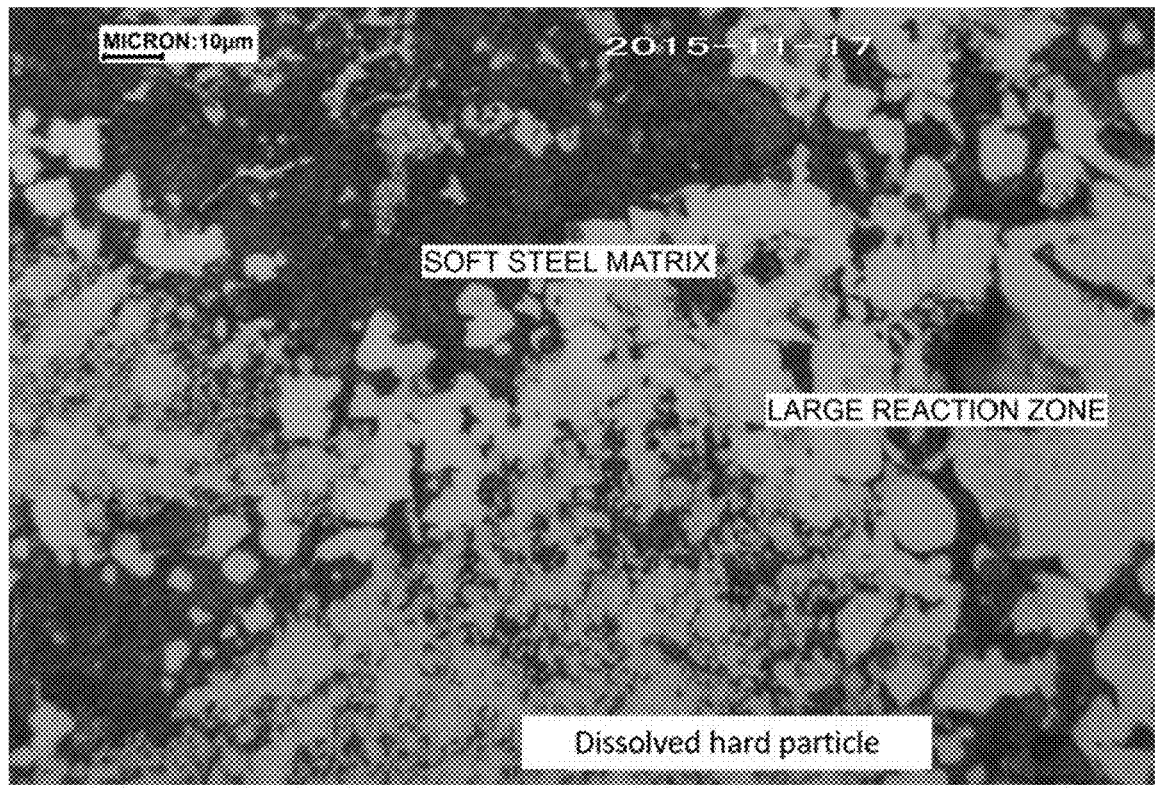
FIG. 10B shows the microstructure of a material manufactured by a molten infiltration approach.

FIG. 10 shows a comparison of the micro structure achieved in an example material 100 when formed by a hat sintering approach (FIG. 10A) versus a molten metal approach (FIG. 10B). That is, FIG. 10A shows the microstructure resulting from following the method(s) of FIG. 5, whereas FIG. 10B shows the microstructure resulting from infiltrating particles 104, 105 and graphene 114 into a molten metal. The metal in both cases is steel.

In FIG. 10A it can be readily seen that the result of hot sintering is the well-defined micro structure shown schematically by FIG. 2. A hard particle 104/106 is embedded within the steel matrix with a well defined shape (slightly triangular in this perspective) and is surrounded by a well-defined reaction zone—i.e., interface layer—of graphene which is substantially consistent in thickness. It is this microstructure which provides the material with its anti-theft properties, as will be appreciated from the description elsewhere herein.

By contrast, in FIG. 10B there is no such microstructure. The hard particles have dissolved into the soft steel matrix, so that it is not possible to distinguish any well-defined hard particle of any particular shape. Similarly, there is no reaction-zone/interface layer of graphene surrounding individual particles, as the graphene has similarly dissolved into the metal matrix. Such a material does not exhibit the beneficial properties for security applications that the material having the microstructure of FIG. 10A does.

It should now be appreciated by those in the art that although a hot sintering technique is preferred, alternative techniques which preserve the micro-structure could potentially also be used.

Testing the Material

Figure 6:
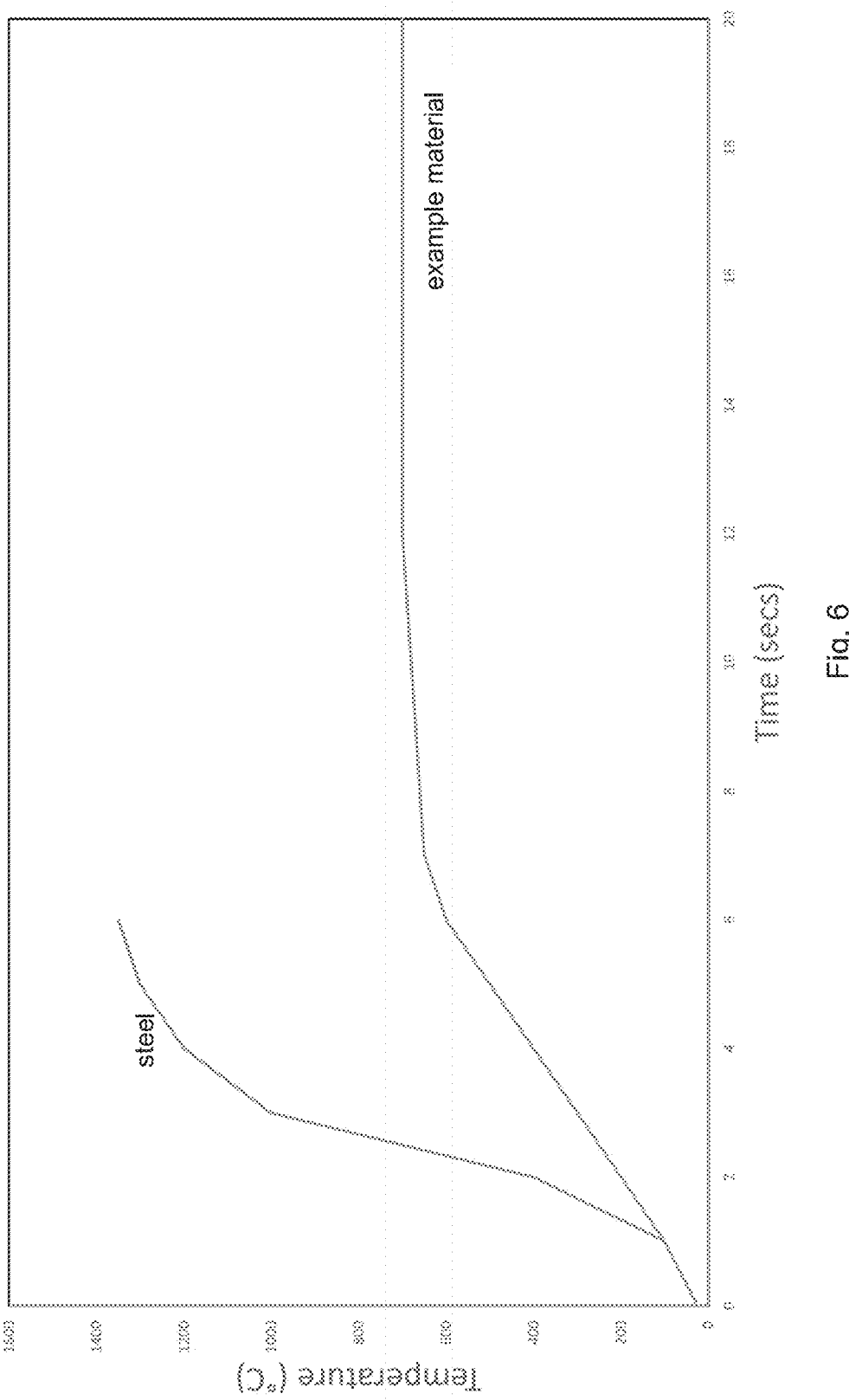
FIG. 6 shows a graph of surface temperature over time for different materials under attack from a silicon carbide angle grinder.

FIG. 6 shows a graph of localised temperature over time during an angle grinder attack against steel and against an example material 100. As shown, a typical angle grinder takes around 6 seconds to heat a local area of steel to above its melting point of 1350° C. By contrast, the example material 100 never reaches the melting point of steel, instead plateauing in the region of 700° C. Thus the steel binder/matrix does not melt in the vicinity of the angle grinder and it is more difficult for the angle grinder to abrade, and therefore cut through, the material 100.

By way of another example, Table 1 shows cutting times for an angle grinder with a 110 mm diameter cutting disc to cut through different materials. Also shown is the number discs required to cut through the material in its entirety and the equivalent resistance of the material according to British Standard EN1143-1 (2019). In Table 1, "standard" material is a material formed from a binder, first type of hard particles, and second type of hard particles but crucially formed without any graphene: in particular the "standard" material is a mild steel matrix with diamond and tungsten particle species. By contrast an 'example material' in Table 1 is fully consistent with the above discussion; in particular being a preferred embodiment of a mild steel matrix, diamond and tungsten carbide particle species, and including a graphene layer around the particles.

TABLE 1

| | Continuous Cutting Time excluding disc change (Mins) | Number of Cutting discs Used | Resistance units from EN1143-1 |
|---|---|---|---|
| 1 mm "standard" material on 2 mm steel backing | 2.5 | 3 | 54 |
| 1 mm example material on 2 mm steel backing | 10 | 9 | 100 |
| 4 mm unprotected steel | 0.1 | <1 | <10 |

As can be seen from the table, the time taken to cut through an object is greatly increased by the presence of the example material 100. Not only is the cutting time increased but the example material 100 acts to attack (i.e. abrade) the cutting disc to force a change in cutting component. This is due to the presence of the hard particles to wear away the cutting disc (or equivalently completely blunt a drill bit). In particular, the vast improvement provided by a material 100 including graphene in addition to the hard particles 104, 106 is readily apparent, representing a four times improvement in cutting time and 3 times improvement in number of discs used.

Incorporating the Material into an Object

In order to gain full benefit of the example material 100 described herein, it will be desired to apply the example material 100 to an object 20 to be protected from cutting. Example attachment methods include welding, casting into a metal matrix, or a strong polymer adhesive, all techniques that will be known to those skilled in the art. As previously mentioned, the example material 100 is particularly suited for use in anti-theft devices.

Figure 7:
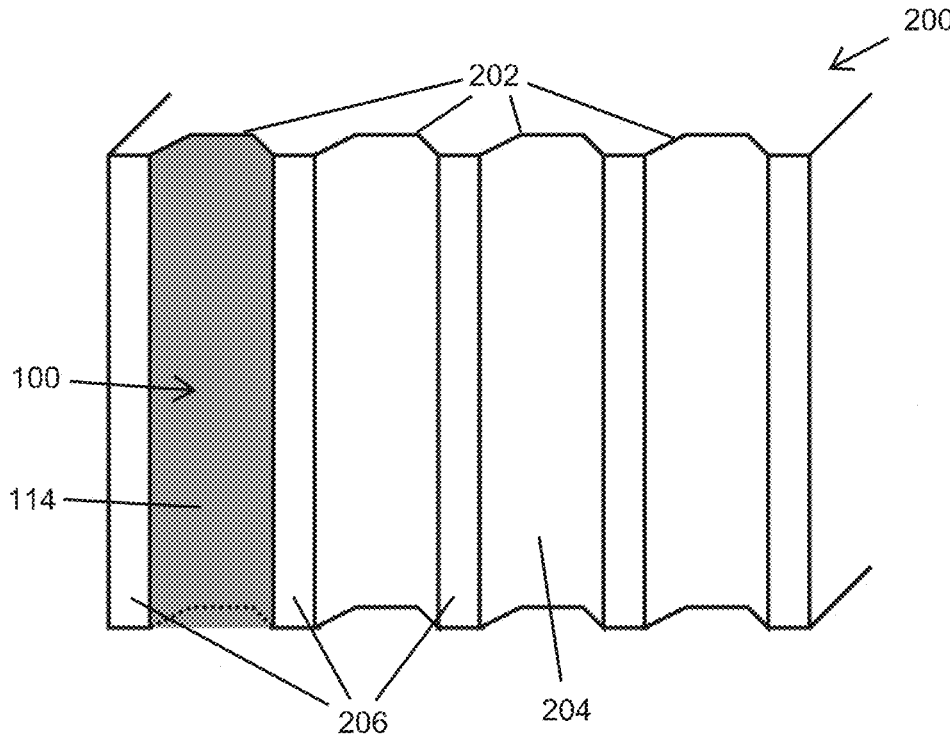
FIG. 7 shows an example material applied to an object.

FIG. 7 shows one example of applying the example material 100 to an object 200. The object 200 in this example is substantially rectangular, and may be envisaged as, for example, a side surface of a lock.

Here the material 100 is inserted into a prepared groove 202 (or slot) in the object 200 and welded to a surface 204 of the groove 202. The object 202 may comprise many such grooves 202 into which may be received the material 100. The material 100 may be shaped to be coterminous with a shape of the groove 202. That is, once the material 100 is inserted into the groove 202, an outer surface 114 of the material 100 may be substantial) flush with an outer surface 206 of the object 200. In this example the material 100 is provided as an elongate trapezoid so as to fill the groove 202. Subsequently the object 200, comprising the material 100, may have a surface coat (not shown) welded to the object 200 so as to cover the material 100 and surface 206. Suitably the edges of the material 100 may be better protected (e.g. from tampering) when the material 100 is applied to the object 200.

It will be appreciated that other methods of applying the material 100 will be possible. For example, the material could be applied fully to a surface of the object 200 so as to coat the object 200.

Improved Anti-Theft Devices

Figure 8:
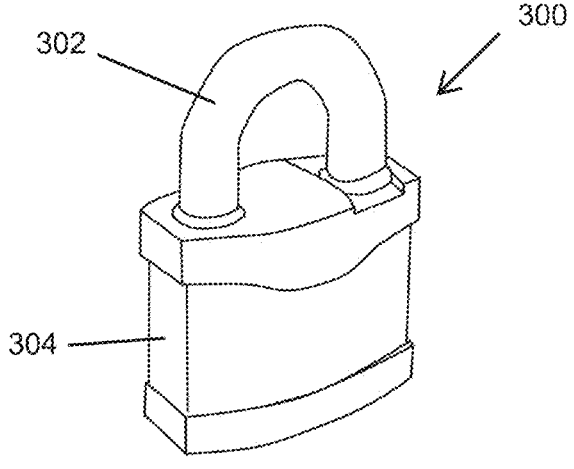
FIG. 8 shows an example lock incorporating an example material.

FIG. 8 shows an example of a pad lock 300 incorporating an example material 100. The example lock 300 may include the anti-theft material 100 in suitable locations that prevent tampering with the lock. In one example the material 100 may be incorporated onto a bar 302 in order to prevent cutting of that part. In another example the material 100 may be incorporated into a body 304 so as to hinder access to the internal locking mechanisms of the lock 300. It will be appreciated that the principles here equally apply to similar devices such as shackles and bicycle locks.

Figure 9:
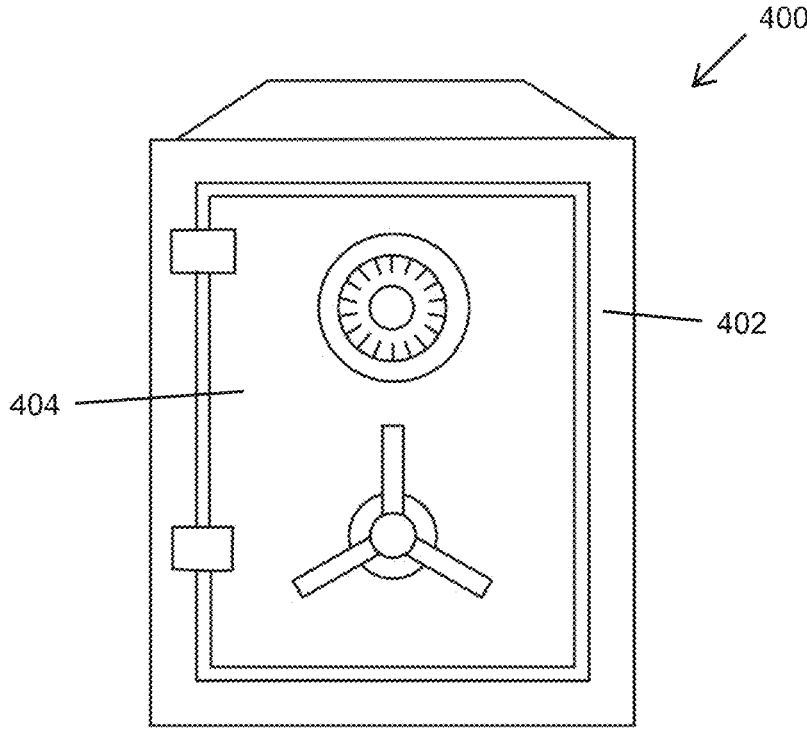
FIG. 9 shows an example safe incorporating an example material.

FIG. 9 shows an example of a safe 400 incorporating an example material 100. In one example the material 100 is bonded directly to an outer surface 402 of the safe 400. In another example, the material 100 is provided as an internal wall between an outer wall and an inner wall of the safe 400. In addition, it is common to cast aluminium or zinc alloys around hard material, such as 10 mm ball bearings, as a general protection in sensitive areas of the safe 400; for example a side wall or door 404. Thus in yet another example the material 100 could be used in the same way around the hard material (i.e. as a replacement for that aluminium or zinc casting).

In summary, exemplary embodiments of an improved material for combatting a cutting tool have been described.

In particular, the described exemplary embodiments provide for an improved material for use in anti-theft devices. Beneficially the improved material increases the time for a would be thief to cut through a security device, thereby increasing the likelihood of discovery and apprehension.

The material may be manufactured industrially. An industrial application of the example embodiments will be clear from the discussion herein.

Attention is directed to all papers and documents which are filed concurrently with or previous to this specification in connection with this application and which are open to public inspection with this specification, and the contents of all such papers and documents are incorporated herein by reference.

All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification, or to any novel one, or any novel combination, of the steps of any method or process so disclosed.

The invention claimed is:

1. A material for an anti-theft device comprising: a binder, a first type of particles, a second type of particles, and graphene, wherein:

the first type of particles are interspersed in the binder and selected from at least one of diamond and cubic boron nitride (CBN);

the second type of particles are also interspersed in the binder and selected from at least one of a metallic carbide and a ceramic material; and the graphene forms an interface layer on each of the first type of particles and second type of particles between the binder and the particles.

2. The material of claim 1, comprising carbon in a zone around each of the particles extending into the binder from the interface layer.

3. The material of claim 2, wherein a size of the zone corresponds to a distance over which a concentration of carbon in the zone changes from one hundred percent at the interface layer to zero percent within the binder.

4. The material of claim 2, wherein the zone comprising carbon has a thickness up to and including 20 microns.

5. The material of any of claim 1, wherein the interface layer has a thickness up to and including 0.345 nanometres.

6. The material of claim 1, wherein the graphene forms 0.00001 to 20 percent by weight of the material.

7. The material of claim 1, wherein the graphene forms 0.00001 to 20 percent by volume of the material.

8. The material of claim 1, wherein the first type of particles includes particles with a size in the range of 50 to 350 microns.

9. The material of claim 1, wherein the second type of particles includes particles with a size in the range of 100 to 250 microns.

10. The material of claim 1, wherein the material has a laminate structure wherein a first layer comprises the first type of particles and a second layer comprises the second type of particles.

11. The material of claim 10, wherein each of the first layer and the second layer is no more than 2 mm thick.

12. The material of claim 1, wherein the material further comprises a metal base plate on which the binder is located.

13. The material of claim 1, wherein the metallic carbide is selected from one or a combination of tungsten carbide, titanium carbide, and chromium carbide.

14. The material of claim 1, wherein the ceramic material comprises at least one of silicon carbide and alumina.

15. The material of claim 1, wherein when the second type of particles are metallic carbide, the binder comprises mild steel.

16. The material of claim 1, wherein when the second type of particles are ceramic material, the binder comprises a resin.

17. A product incorporating the material according to claim 1.

18. The product of claim 17, wherein the product is selected from one of a lock, a shackle and a safe.

19. A method of manufacturing of the material of claim 1 by hot-sintering, whereby the first type of particles, second type of particles, and graphene are sintered together with the binder.

20. A method of applying the material of claim 1 to an object by at least one of welding, casting into a metal matrix, or bonding by a polymer adhesive.

\* \* \* \* \*